May 28, 1929.  H. P. MASSEY  1,714,608
AIRCRAFT
Filed Feb. 7, 1925  3 Sheets-Sheet 1
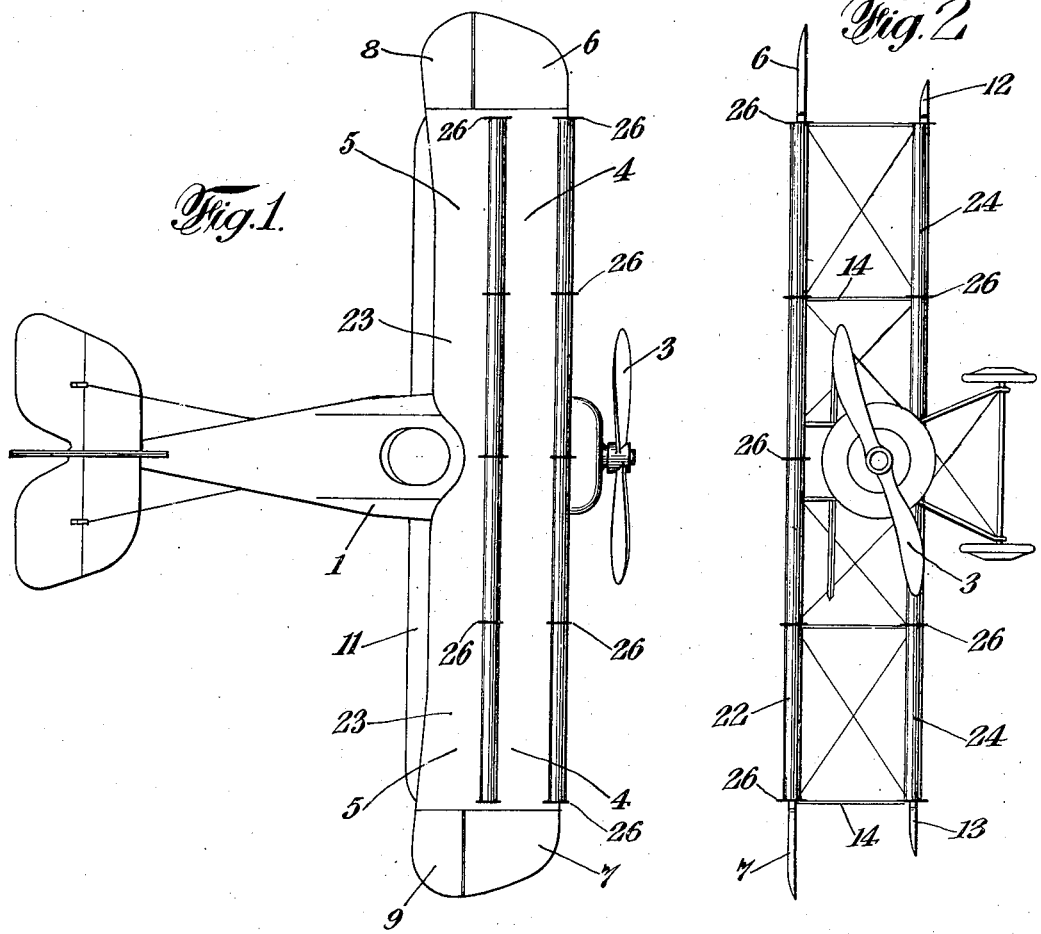
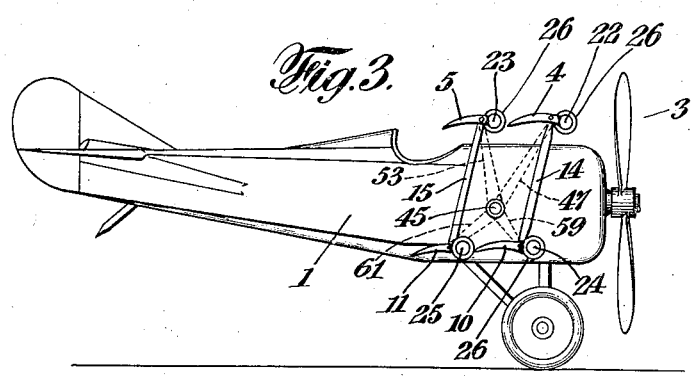
INVENTOR
Henry P. Massey
BY
Ward Crosby + Smith
ATTORNEYS

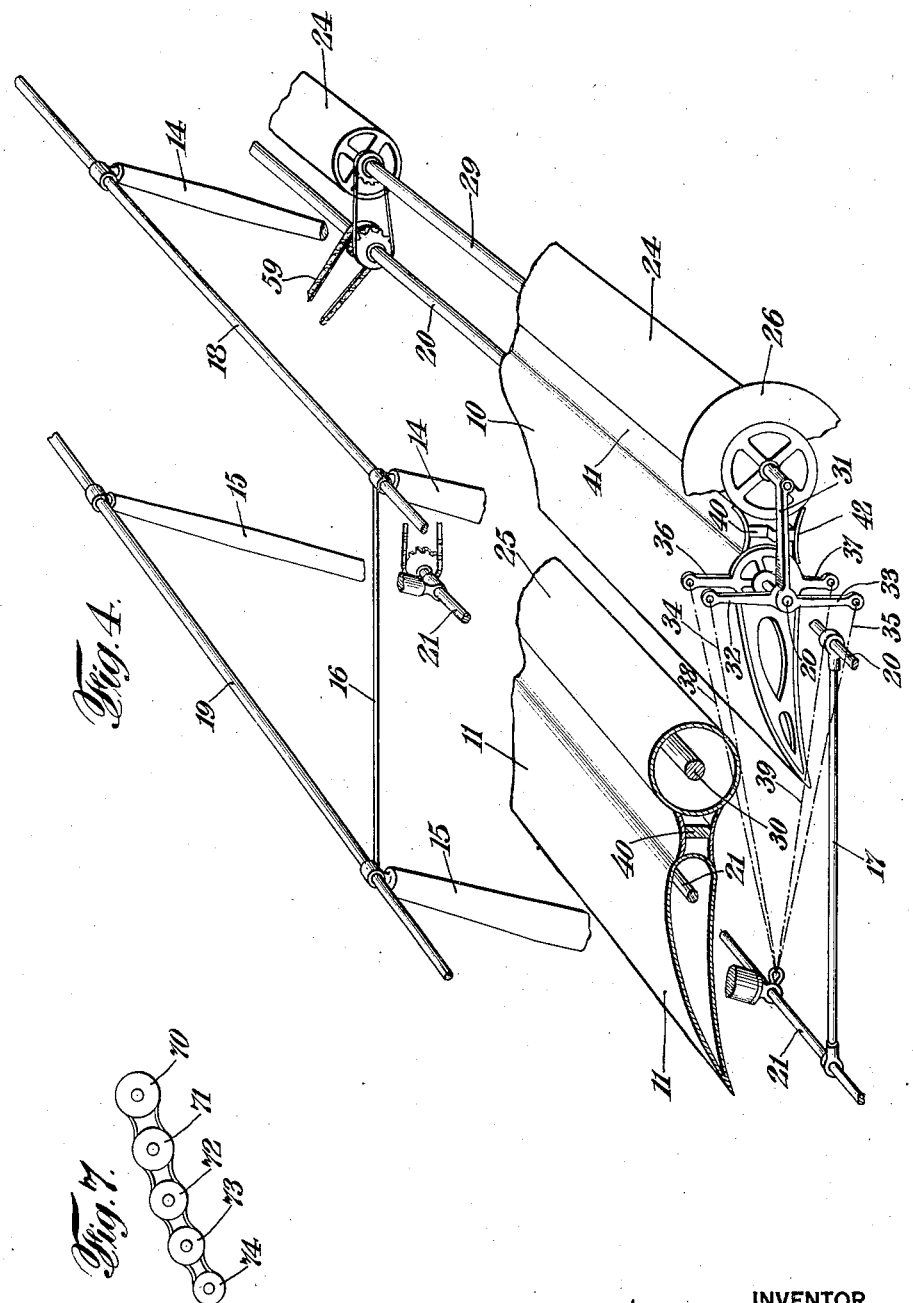

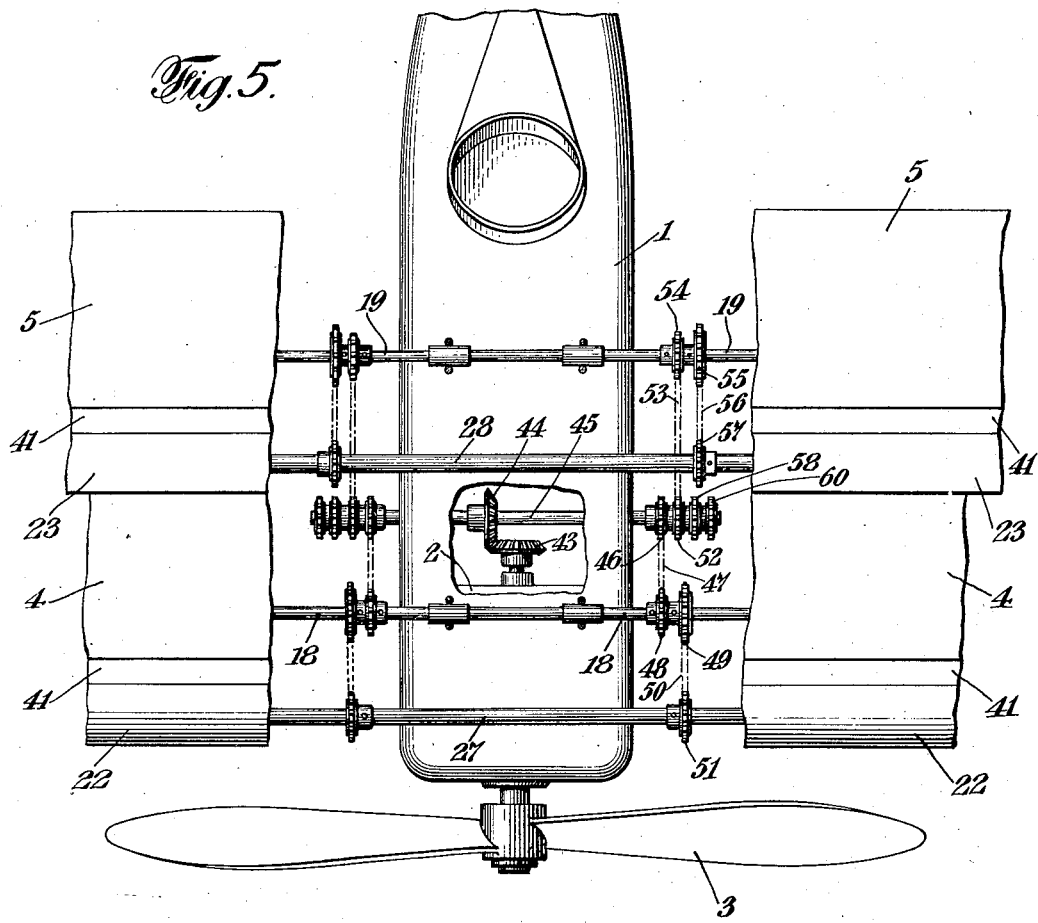
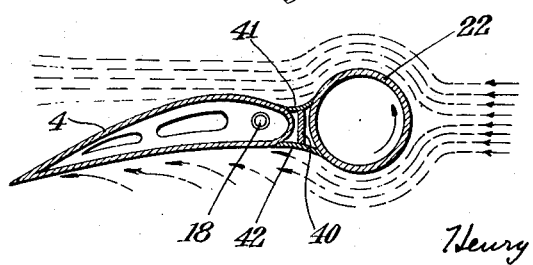

Patented May 28, 1929.

1,714,608

UNITED STATES PATENT OFFICE.

HENRY P. MASSEY, OF NEW YORK, N. Y.

AIRCRAFT.

Application filed February 7, 1925. Serial No. 7,457.

My invention relates to improvements in aircraft, including thereby not only aeroplanes and hydro-aeroplanes but lighter than air aircraft as well as heavier than air aircraft. The main object of the invention is to provide an arrangement whereby the lifting or supporting effect of such craft in the air is increased. Further and more specific objects, features and advantages will more clearly appear from the detail description given below taken in connection with the accompanying drawings which form a part of this specification.

In the drawings, Fig. 1 is a plan view of an aeroplane embodying my improvements in one form. Fig. 2 is a front view of the same. Fig. 3 is a side view of the same. Fig. 4 is a perspective of certain parts thereof. Fig. 5 is a plan view of certain parts thereof. Fig. 6 is a transverse section through an airfoil and one of the rotating bodies illustrating the air currents resulting. Fig. 7 illustrates a modification. Figs. 1, 2, 3, 4 and 5, 6 and 7 are all largely diagrammatical and various parts have been omitted or broken away in order to more clearly illustrate the invention.

Referring to the drawings, 1 represents the body portion of the aeroplane in the forward portion of which is located the motor 2 (see Fig. 5) which drives the propeller 3. 4 represents a forward upper airfoil or wing. 5 represents a rear upper airfoil or wing located directly behind the airfoil 4. At the ends of the airfoils 4 and 5 are provided members 6, 7, 8 and 9 forming extensions of the airfoils. The members 7 and 9 are not shown in Fig. 3. 10 represents a lower forward airfoil. 11 represents lower rear airfoil. These are provided at the end with similar extensions 12 and 13. The airfoils are relatively thick adjacent their leading edges and taper rearwardly in vertical cross section so that they are relatively thin at their rear edges. The airfoils are carried by the frame formed of forward upright struts 14, rear upright struts 15, top brace rods 16, bottom brace rods 17, upper forward transverse bar 18, upper rear transverse bar 19, lower forward transverse bar 20 and lower rear transverse bar 21. Arranged adjacent the forward part or leading edge of the airfoil 4 and slightly in advance thereof is a rotating body comprising a cylinder 22 made up of a plurality of sections whereby an elongated rotating body is provided extending along the front edge of the airfoil 4 horizontally and transversely to the movement of the aeroplane. 23 represents a similar rotating body made up of a plurality of cylindrical sections and similarly situated with respect to the airfoil 5. 24 represents another similar rotating body similarly arranged with respect to the airfoil 10. 25 represents another similar rotating body and similarly situated with respect to the airfoil 11. Each of these rotating cylindrical sections is provided with circular flanges 26 at spaced intervals. These horizontally rotating bodies are circular in vertical cross-section, i. e. in a plane at right angles to their axis of rotation. The airfoils are relatively stationary with respect thereto. The airfoils 4, 5 with their rotating bodies 22, 23 form a substantially continuous lifting surface and the airfoils 10, 11 with their rotating bodies 24, 25 form another lower substantially continuous lifting surface. Each said lifting surface thus includes a plurality of the rotating bodies in the preferred form shown, and the lifting surface or element being relatively thick adjacent its leading edge and relatively thin at its rear edge. The horizontal cylindrical bodies 22, 23, 24 and 25 are secured to shafts 27, 28, 29, and 30 respectively. These shafts are suitably journaled in arms 31 rotatably mounted upon the bars 18, 19, 20 and 21 respectively. The arms 31 have integral therewith lever arms 32 and 33 to which are connected suitable wires 34 and 35 which extend in any suitable manner to the body of the machine whereby one or the other of them may be pulled by the operator in order to oscillate the arm 31 about its axis 20 and so raise or lower and adjust the position of the rotating cylinders 22, 23, 24 and 25 with respect to their respective airfoils. The airfoils 4, 5, 10 and 11 are rotatably mounted upon the bars 18, 19, 20 and 21 respectively and have secured thereto arms 36 and 37 to which are connected wires 38 and 39 leading to the body of the machine whereby they may be pulled by the operator in order to oscillate the airfoils 4, 5, 10 and 11 about the bars 18, 19, 20 and 21 as axes respectively in order to adjust the inclination of the airfoils with respect to the body of the machine and independently of the rotating cylinders 22, 23, 24 and 25 respectively. The arms 31 have rigidly secured thereto frame pieces or brackets 40 to the bottom and top of which is secured flexible sheet metal aluminum strips 41 and 42 covering the top and bottom of the space between the rotating cylinders and the leading edges of the airfoils respectively. The rotating cylinders 22, 23, 24 and 25 may be rotated from the engine or motor of the aeroplane by any suitable connection or by independent electric or other motors, but for convenience of illustration I have shown them driven from the motor of the aeroplane by means of shaft and sprocket connection. Thus the motor shaft of the engine is provided with a bevel gear 43 (see Fig. 5) driving a gear 44 which in turn drives a jack shaft 45. The jack shaft 45 is provided on one end with a sprocket wheel 46 over which passes a sprocket chain 47 driving sprocket 48, which drives sprocket 49 over which passes the sprocket chain 50 driving a sprocket 51 secured to the shaft 27 to which the rotating cylindrical sections 22 are secured and thereby rotated. The shaft 45 is also provided with a sprocket 52 over which passes a sprocket chain 53 driving a sprocket 54 which rotates on the shaft 19 and drives a sprocket 55 over which passes a sprocket chain 56 driving a sprocket 57 secured to the shaft 28 to which the cylindrical sections 23 are secured and thereby rotated. The shaft 45 is also provided with a sprocket 58 and similar connections for driving the rotating body 24 as indicated by dotted lines at 59 in Fig. 3. The shaft 45 is also provided with a sprocket 60 and similar connections as indicated at 61 in Fig. 3 for driving the rotating body sections 25. A similar set of sprockets and sprocket chains may be provided on the other side of the body portion 1 of the aeroplane driven from the other end of the jack shaft 45 in order to balance the application of the driving power and if desired in such case the rotating cylindrical bodies on each side of the motor axis may be separately driven, i. e., one from the sprockets 47, 52, 58 and 60 and the other from sprockets on the other side of the body portion of the machine.

With the machine in operation in the air and the rotating cylinders 22, etc. being rotated in the direction shown by the arrow in Fig. 6, and the wind striking the cylinder as indicated by the lines in Fig. 6, there will result because of the skin friction between the cylinders and the air, an increase in velocity of the air over the top of the rotating cylinders and a decrease in the velocity of the air passing underneath the cylinders since the cylinders are rotated in a direction to aid the air to pass more swiftly over the top of the cylinders, and to decrease the velocity of the air passing underneath the cylinders by reason of the friction and inverse direction of air currents. This results in a reduction of pressure over the top of the cylinder while therebeneath an increase in pressure is produced. This is in accordance with Bernoulli's theorem which states that where the velocity is greatest the pressure is least and correspondingly where the velocity is least the pressure is greatest. Each cylinder is, therefore, subjected to a resultant upward force or lifting effect. Similarly, an upward force or supporting effect is exerted on the lower surface of each airfoil by reason of the decreased air velocity and increased air pressure caused by the adjacent rotating cylinder at the leading edge of the airfoil. As above explained the position of the rotating bodies 22, 23, 24 and 25 may be adjusted in height with respect to the airfoils 4, 5, 10 and 11 respectively and the inclination of the airfoils 4, 5, 10 and 11 may be adjusted independently in order to get the maximum of this effect. This regulation of position is important as the resultant pressure on the surfaces of the airfoil is in part dependent upon the direction and velocity of the stream line flow warped around the rotating surfaces which in turn is a function of their angular velocity and the transversal speed of the wind passing around them. The accelerated wind velocity passing over the upper surface of the rotator and thence transmitted to the airfoils serves to increase the negative pressure on a portion of the upper surfaces of the airfoils whence their lifting power is further increased. As stated before the retardation of the air flow on the lower surfaces of the rotating bodies and their respective airfoils tends to increase the positive pressure or upward forces exerted thereon. The net result, therefore, of each rotating body in combination with its airfoil is a marked increase of the ratio of lift to drag commonly known as the L/D ratio. The discs 26 on the rotating bodies are used to prevent the air currents from spreading laterally and so tend to concentrate the pressure variations in order to get the maximum benefit therefrom. In order to take advantage of the increased wind velocity or stream lines which wrap around the upper sides of the rotating body, the curved plates 41 and 42 are inserted between the rotating body and the leading edges of the airfoil which serves to direct the so-called stream lines over the surfaces of the airfoil, in particular, the upper surface thereof. These plates are substantially contiguous with both the airfoils and rotating bodies so as to practically close the intervening gap. Since these plates are rigidly fixed with respect to the arms 31, they will swing with the arms 31, when the height of the rotating bodies is adjusted with respect to the airfoils, the rear edges of the plates 41 and 42 sliding over the forward or leading edge of the airfoils which is on the arc of the circle about the axis of the bars 18, 19, 20 and 21 on which the arms 31 are pivoted. The forward edges of the plates 41 and 42 are substantially contiguous with the face of the rotating bodies 20, but do not prevent the rotating bodies from easily rotating with respect thereto. Since there is very little friction and practically no other load on the rotating bodies, it will require very little power to rotate them at fairly high speed in order to obtain the effect above pointed out.

With the aeroplane having a single wing or airfoil, only one rotating body may be used, but in the drawings I have illustrated an aeroplane having two upper airfoils and two lower airfoils which have their respective rotating bodies at the leading edge thereof.

While I have described my improvements in great detail and with respect to one form thereof, and then largely diagrammatically, I do not desire to be limited to such form or detail since many changes or modifications may be made and the invention embodied in widely different forms without departing from the spirit, and scope thereof in its broader aspects. The form and number of airfoils and their location may be greatly varied, likewise the form of the rotating body may be greatly varied. It may for example have either a plain corrugated notched or corrguated and notched surface, or may have a cross section in the form of a cross or otherwise, or it may be one which is provided with curved blades and adapted to be adjustable in cross sectional size. In fact the body may have any symmetrical cross section and the position thereof with respect to the airfoil may be considerably varied. Also a series of rotating bodies may be arranged one directly behind another as illustrated in Fig. 7 where the rotating cylinders 70, 71, 72, 73 and 74, decreasing in size toward the rear, form substantially the whole wing or a substantially continuous lifting surface made up of a plurality of rotating bodies. Likewise the method of rotating the rotating bodies from the motor of the aeroplane or otherwise may be greatly varied, the method shown being merely shown for the sake of convenience of illustration. Hence, I desire to cover all changes and modifications coming within the language or scope of any one or more of the appended claims.

What I claim as new and desire to secure by Letters Patent is:

1. An aircraft having an elongated body extending horizontally and rotating about an axis extending at right angles to the movement of the aircraft, said body being located adjacent but in advance of the leading edge of an airfoil of the aircraft, means for rotating said body and means for adjusting the height of said rotating body with respect to said airfoil.

2. An aircraft having an elongated body rotating on its longitudinal axis, said body extending transverse to the movement of the aircraft, and associated with an airfoil to increase the lifting or supporting effect thereof, and means for adjusting the position of said rotating body with respect to the airfoil.

3. An aircraft having an elongated body extending horizontally and rotating about an axis extending at right angles to the movement of the aircraft, said body extending along the leading edge of an airfoil of the aircraft and means for adjusting the height of said body with respect to the airfoil.

4. An aircraft having an elongated body extending horizontally and rotating about an axis extending at right angles to the movement of the aircraft, said body extending along the leading edge of an airfoil of the aircraft, and means for adjusting the inclination of the airfoil on the aircraft.

5. An aircraft having an elongated body extending horizontally and rotating about an axis extending at right angles to the movement of the aircraft, said body extending along the leading edge of an airfoil of the aircraft, and means for adjusting the inclination of the airfoil on the aircraft, without changing the position of the rotating body with respect to the body of the aircraft.

6. An aircraft having an elongated body extending horizontally and rotating about an axis extending at right angles to the movement of the aircraft, said body extending along the leading edge of an airfoil of the aircraft, and means for adjusting the inclination of the airfoil on the aircraft, without changing the position of the rotating body with respect to the body of the aircraft, and means for independently adjusting the height of said rotating body with respect to said airfoil and the body of the aircraft.

7. An aeroplane having a plurality of airfoils with rotating bodies arranged at the front thereof respectively, said bodies being elongated and extending horizontally and transversely of the movement of the aircraft and rotating about a horizontal axis extending transversely of the movement of the aircraft, and means for independently adjusting the inclination of said airfoils on the aircraft without changing the position of the rotating bodies with respect to the body of the aircraft.

8. An aircraft having a plurality of airfoils with rotating bodies arranged at the front thereof respectively, said bodies being elongated and extending horizontally and transversely of the movement of the aircraft and rotating about a horizontal axis extending transversely of the movement of the aircraft, and means for independently adjusting the height of said rotating bodies with respect to said airfoils respectively.

9. An aircraft having means for producing a lifting effect thereon comprising a horizontally extending body substantially circular in vertical cross section and rotating about a horizontal axis, a relatively stationary airfoil, said rotating body extending along the leading edge of the airfoil, and independent means for closing the gap between the rotating body and the airfoil.

10. An aircraft having means for producing a lifting effect thereon comprising a horizontally extending body rotating about a horizontal axis, a relatively stationary airfoil having a rounded leading edge, said rotating body extending along the leading edge of the airfoil, and independent means for closing the gap between the rotating body and the airfoil.

In testimony whereof I have signed my name to this specification.

HENRY P. MASSEY.